Nov. 28, 1950 — L. E. BUTZMAN, SR — 2,531,610
CLUTCH AND BRAKE MECHANISM FOR FISHING REELS
Filed May 27, 1948 — 2 Sheets-Sheet 1

INVENTOR.
Lester E. Butzman, Sr
BY
Woodling and Kroot
attys

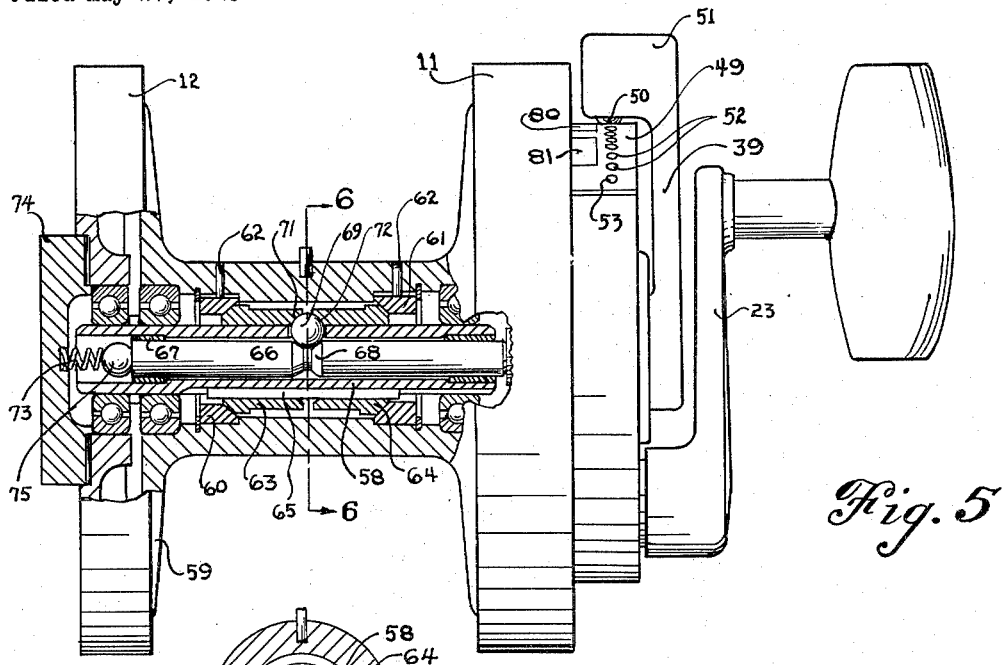

Patented Nov. 28, 1950

2,531,610

UNITED STATES PATENT OFFICE 2,531,610

CLUTCH AND BRAKE MECHANISM FOR FISHING REELS

Lester E. Butzman, Sr., Rocky River, Ohio

Application May 27, 1948, Serial No. 29,462

6 Claims. (Cl. 192—14)

1

The invention relates in general to a reel construction and more particularly to a fishing reel wherein a novel brake and clutch mechanism is provided which gives a wide and sensitive range of degrees of braking or clutching effectiveness and wherein such frictionally engageable brake and clutch mechanism is easily controlled by a conveniently located lever.

An object of the invention is to provide an improved brake and clutch mechanism for a reel such as a fishing reel.

Another object of the invention is to provide an improved brake and clutch mechanism having a lever which is conveniently located and easily actuated to effect a wide range of control of the brake and clutch action of a fishing reel.

Another object of the invention is to provide in a fishing reel a brake and clutch construction in the hollow hub of the reel wherein two coniform friction elements are relatively movable through the medium of the axial displacement of a shaft inside a sleeve shaft which is adapted to drive the reel through the friction elements.

A still further object of the invention is to provide in a fishing reel a first friction element on the inner surface of the hollow hub of the reel and to provide a second friction element adapted to frictionally engage the first friction element upon axial movement of an axial member concentrically disposed within a sleeve shaft which nonrotatively carries the second friction element and which may be rotated by a crank.

Yet another object of the invention is to provide in a fishing reel coniform frictional elements, one of which is crank-driven, and which are adapted to have a relative movement to effect frictional engagement to permit driving of the reel therethrough and which also provide a braking action because the crank-driven friction element is only unidirectionally rotatable.

Another object of the invention is to provide in a fishing reel an indicating scale for cooperating with a brake lever and wherein colored segments are provided on the indicating scale to aid in the rapid determination of the degree of braking effective at any given setting of the brake lever.

Still another object of the invention is to provide a rotatable threaded portion in a fishing reel to be axially displaced to actuate a brake and wherein the axial displacement of the threaded portion is transmitted by a thrust bearing to minimize friction.

Other objects and a fuller understanding may be had by referring to the following description

2 and claims taken in conjunction with the accompanying drawings in which:

Figure 5 is a partially sectional view of a modified construction of the fishing reel;

Figure 6 is a cross-sectional view taken on the line 6—6 of Figure 5;

Figure 7 is a partially sectional view of a still further modification of the invention;

Figure 8 is a plan view of the brake indicating scale having colored segments for rapid determination of the amount of braking pressure; and Figure 9 is a side view of the indicating scale of Figure 8.

Figure 1:
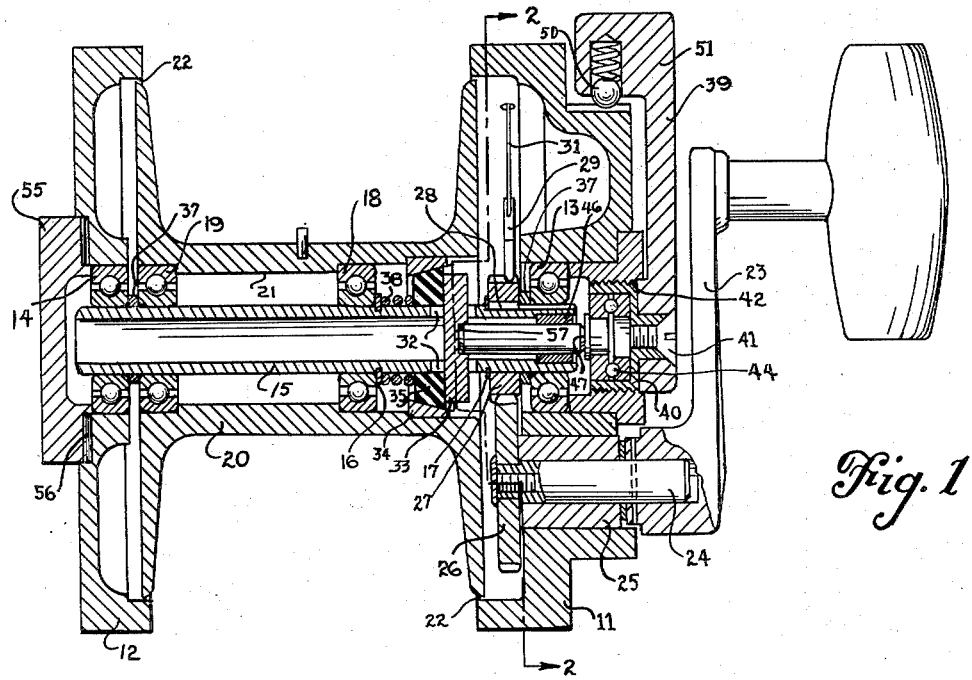
Figure 1 is a cross-sectional view taken through the center of a fishing reel and of the preferred embodiment of the invention.

The Figure 1 shows the preferred embodiment of the invention wherein 11 designates a head end plate and 12 designates a tail end plate. These end plates are fixedly mounted in a spaced relationship by a suitable cross member not shown in the drawings and which suitable cross member may accommodate a bracket for attaching the reel to the fishing rod. A bearing 13 in the head end plate and a bearing 14 in the tail end plate rotatively support a sleeve shaft 15. Bearings 18 and 19 are mounted on the sleeve shaft 15 and rotatively support a reel 20 which reel has an inner surface 21 defining a hollow hub. The reel 20 is thus rotatable with respect to the fixedly mounted end plates 11 and 12 and is adapted preferably to have a small clearance 22 at the outer periphery of this reel 20 and the end plates 11 and 12.

Figure 2:
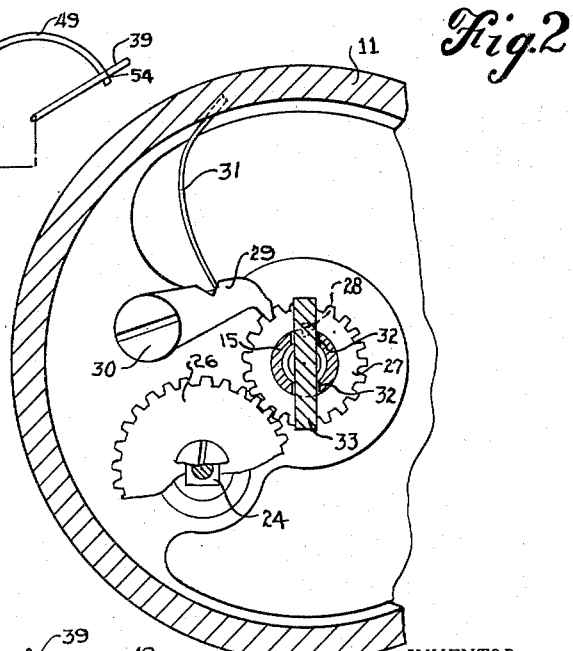
Figure 2 is a cross section taken along the line 2—2 of Figure 1.

The head end plate 11 is adapted to carry a crank arm 23 which may be manually rotated to provide a driving torque to the reel 20. The axle 24 of the crank arm 23 is journaled in a bearing 25 carried in the head end plate 11 and has a drive gear 26 fixedly attached to the end thereof opposite to the end on which the crank arm 23 is fixedly attached. This drive gear 26 meshes with and is adapted to drive a driven gear 27. The driven gear 27 is fixedly attached to the sleeve shaft 15 by any suitable means, such as by the key 28. A pawl 29, as better shown in Figure 2, is adapted to permit only unidirectional rotation of the driven gear 27 and is pivotally mounted by a machine screw 30 to the head end plate 11 and urged against the driven gear 27 by a wire spring 31. The sleeve shaft 15 has diametrically opposed slots 32 through which a transverse bar member 33 extends. The slots 32 are preferably made to closely engage the transverse bar member 33 so that there is little lateral movement relative to the axis of the sleeve shaft 15 but which slots are long enough axially to permit some axial displacement of the transverse bar member relative to the sleeve shaft 15. A first coniform friction element 34 is adapted to be fixedly carried on the inner surface 21 of the reel 20, and a second coniform friction element 35 is adapted to be disposed closely adjacent the first friction element 34 and to cooperate frictionally therewith. The second friction element 35 is adapted to peripherally engage the sleeve shaft 15 and is axially displaceable thereon. The transverse bar member 33 is adapted to engage notches 36 in the second friction element 35 so that this second friction element 35 rotates in accordance with the rotation of the transverse bar member 33 and the sleeve shaft 15. Collars 16 and 17 are disposed in annular grooves in the sleeve shaft 15 adjacent the bearing 18 and the driven gear 27, respectively, to thus prevent axial displacement of the sleeve shaft 15. Spacers 37 are peripherally mounted on the sleeve shaft between the bearings 14 and 19 and the bearing 13 and driven gear 27 to axially space the reel 20 relative to the end plates 11 and 12 and to take up all slack axial movement. A cover plate 55 is fastened to the tail end plate 12, and a shim pack 56 is disposed therebetween to accomplish the correct axial tolerance of all elements on the sleeve shaft 15. A coil spring 38 bears against the collar 16 and against the second friction element 35 to urge the friction elements out of mutual frictional engagement.

A brake lever 39 is adapted to be manually adjustable to control the degree of braking action or degree of frictional engagement of the friction elements 34 and 35. The brake lever 39 is pivotally mounted about an axis concentric with the axis of the sleeve shaft 15 and is fixedly attached to an axial member 40 by any suitable means, such as by splines and the screw 41. In initial assembly, the brake lever 39 may thus be located relative to the axial member 40 in order to provide a full range of braking torque. The axial member 40 has an external threaded portion 42 engageable with an internal threaded portion 43 in the head end plate 11. The axial member 40 is thus adapted to be rotatively positionable by the manually operable brake lever 39, and upon such rotation the axial member 40 is thus axially displaced since the threaded portions 42 and 43 act as a cam and a cam follower to produce such axial displacement. The axial member 40 has a thrust bearing 44 axially concentric therewith. A rod or inner shaft 45 is concentrically disposed in the sleeve shaft 15 and is journaled in a sleeve bearing 46. The inner shaft 45 has a first end 47 bearing against the thrust bearing 44 and a second end 48 bearing against a depression 57 in the transverse bar member 33. The thrust bearing 44, the inner shaft 45 and the transverse bar member 33 thus form linkage means for transferring the axial displacement of the axial member 40 to the second coniform friction element 35 upon rotational movement of the brake lever 39.

Figure 3:
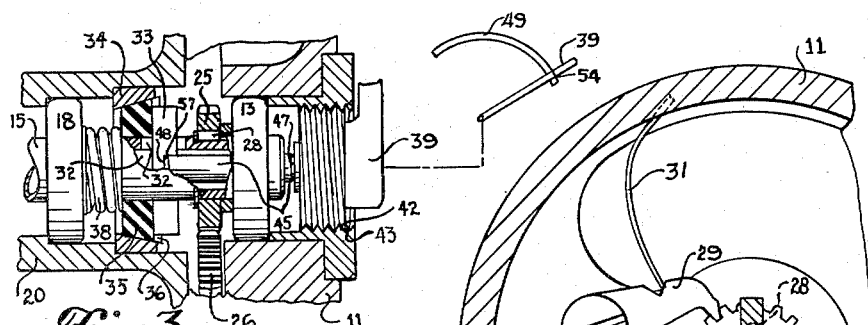
Figure 3 is a cross-sectional view of a portion of the Figure 1 and diagrammatically showing the brake in the fully engaged position.
Figure 4:
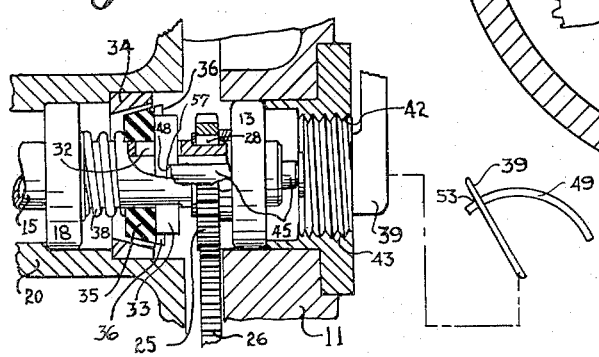
Figure 4 is a cross-sectional view similar to that shown in Figure 3 but showing the brake in the off position.

As better shown in the Figure 5, the brake lever 39 is adapted to cooperate with a graduated scale 49. The brake lever 39 preferably has a spring loaded ball 50 in the handle end 51 thereof to be received by a plurality of depressions 52 in the graduated scale 49. The brake lever 39, therefore, may be rotated to a plurality of positions which are perceivable to the operator as the ball 50 engages any of the depressions 52. The graduated scale 49 has an off position 53 and an on or completely engaged position 54. The off position 53 of the brake lever 39 is a diagrammatically depicted in the Figure 4 wherein the friction elements 34 and 35 are shown out of frictional engagement. The Figure 3 shows the friction elements 34 and 35 in complete frictional engagement, and the brake lever 39 is diagrammatically shown in the completely engaged position 54.

The Figures 8 and 9 show the indicating scale 49, whereon colored arcuate segments 78, 79, 80 and 81 are provided to provide a more rapid determination by the operator of the degree of braking pressure at any given setting of the brake lever 39. Preferably these segments 78, 79, 80 and 81 are colored red, yellow, green and black, respectively, thus immediately conveying information to the operator as to the safeness or dangerousness of a particular braking pressure. The red segment would indicate that it would be possible to break a line of given tensile strength if the effective diameter of the reel of line is less than the maximum diameter of the reel. The yellow segment would indicate that it would not be possible to break the line when of proper tensile strength for the particular size reel in use, and the green segment would indicate the usual or safe braking torque for average conditions. The black segment would indicate very low braking torque, approaching the free spooling condition at the off position 53.

In operation, the brake and clutch mechanism of the fishing reel may be conveniently manipulated by the operator. The brake lever 39 is mounted on the head end plate 11 and pivoted on the axis of the reel 20 which makes it convenient to the operator's hand, which normally actuates the crank arm 23. The friction elements 34 and 35 provide the dual function of both braking and clutching actions since mutual frictional engagement of these friction elements is necessary to effect the transmission of driving torque from the crank arm 23 to the reel 20. Since the pawl 29 prevents reverse rotation of the driven gear 27, the second friction element 35 is, therefore, not capable of reverse rotation. This means that when the crank arm 23 is stationary, the second friction element 35 is also stationary; and any rotation of the reel 20 caused by the playing of a fish is opposed by the frictional engagement between the friction elements 34 and 35. If the brake lever 39 is moved to the off position 53, there is a minimum of frictional engagement between the friction elements 34 and 35 and the reel 20 is thus practically freely rotatable. As the brake lever 39 is progressively moved to the completely engaged position 54, the frictional engagement between the friction elements 34 and 35 progressively increases so that either the degree of braking torque or the degree of driving torque is correspondingly increased. It can thus be seen that the brake lever 39 permits a smooth, accurate and convenient control over a satisfactorily wide range of both the driving and braking torque wherein the braking torque exists between the reel 20, as rotated by the fish, and the stationarily locked second friction element 35, and the driving torque exists between the second friction element 35, as rotatively driven by the crank arm 23 and the reel 20, which resists rotation by the pull of the fish.

The Figures 5 and 6 show a further modification of the invention which includes many features found in the preferred embodiment of Figures 1 to 4 and differs principally therefrom in that two friction clutches are provided. The Figure 5 shows the reel construction partially in cross section wherein the head end plate 11 is constructed substantially identical to the head end plate 11 of Figure 1 wherein the crank arm 23 rotatively drives a sleeve shaft 58 through the medium of drive and driven gears 26 and 27, respectively. The reel 59 has fixedly attached thereto first and second coniform friction elements 60 and 61, respectively, which are shown as being attached by the pins 62. Third and fourth coniform friction elements 63 and 64 are adapted to cooperate with the first and second friction elements 60 and 61, respectively. These third and fourth friction elements 63 and 64 peripherally engage the sleeve shaft 58 and are nonrotatively attached thereto by the key 65. The third and fourth friction elements 63 and 64 are adapted to axially move relative to the sleeve shaft 58, which sleeve shaft is not axially displaceable relative to the end plates 11 and 12. The third and fourth friction elements 63 and 64, therefore, are axially movable to frictionally engage the first and second friction elements 60 and 61, respectively. Since the third and fourth friction elements 63 and 64 are keyed to the sleeve shaft 58, they rotate in accordance with the rotation of the crank arm 23 and transmit driving torque to the reel 59 in accordance with the degree of frictional engagement between the friction elements.

The brake lever 39, through the medium of the axial member 40 and the thrust bearing 44, imparts an axial movement to an inner shaft 66 which is concentrically mounted within the sleeve shaft 58 and is journaled in sleeve bearings 67. The inner shaft 66 has a cam surface 68 which is part of the linkage means between the axial member 40 and the third and fourth friction elements 63 and 64 to impart axial movement thereto. This cam surface 68 is shown in this embodiment as being a conical surface having the axis thereof coextensive with the axis of the inner shaft 66 and sleeve shaft 58. A plurality of balls 69, better shown in Figure 6, are adapted to bear against this cam surface 68 and to be radially displaced upon axial displacement of the inner shaft 66. The balls 69, shown in Figure 6 to be three in number, are receivable in holes 70 in the sleeve shaft 58. The balls 69 are adapted to have a close tolerance with the holes 70 to thus minimize any longitudinal or axial displacement of the balls 69 upon axial displacement of the inner shaft and to thus transform such axial displacement of the inner shaft 66 into a radial displacement of the balls 69. The balls 69 are adapted to bear against and operate on a cam surface 71 and 72 of the third and fourth friction elements 63 and 64, respectively. It may be thus seen that a radial displacement of the balls 69 cause an axial displacement of the third and fourth friction elements 63 and 64 to thus cause frictional engagement between the friction elements. The inner shaft 66 is urged toward the right, as viewed in the Figure 5, by a coil spring 73 which acts between a cover 74 on the tail end plate 12 and a ball 75 bearing against the left-hand end of the inner shaft 66. The inner shaft 66 is thus urged toward the right to bear against the thrust bearing 44 disposed in the axial member 40.

The operation of the construction shown in Figure 5 is quite similar to the operation of the preferred embodiment of Figures 1 to 4. The rotational positioning of the brake lever 39 causes axial displacement of the inner shaft 66, a radial displacement of the balls 69, and a consequent axial displacement of the third and fourth friction elements 63 and 64 to thus effect frictional engagement of the friction elements and thus control the braking or driving torque between the reel 59 and the stationary end plates 11 and 12. The construction shown in this embodiment of Figure 5 offers a variation of the preferred embodiment of Figure 1.

The Figure 7 shows a still further modification of the invention wherein the friction elements 76 and 77 have a clutch surface which is not coniform but is shown as being disc shaped or in a plane perpendicular to the axis of the inner shaft 66. Such a disc-shaped clutch surface may also be employed in the construction of the preferred embodiment shown in Figures 1 to 4. The disc-shaped clutch surface has the advantage of permitting a greater clearance between the cooperating clutch surface for a given relative axial displacement therebetween.

Although the invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A brake and clutch mechanism for a reel including a frame having first and second end plates, means for fixedly holding said end plates spaced apart, a sleeve shaft journaled in said first and second end plates for rotation therein, a hollow hub having an inner surface and journaled on said sleeve shaft, a first friction element fixedly carried on the inner surface of said hollow hub, pawl means for permitting only unidirectional rotation of said sleeve shaft, means for rotating said sleeve shaft in said unidirectional rotation, a second friction element nonrotatatively carried by said sleeve shaft and disposed closely adjacent said first friction element, an axial member concentrically disposed relative to said sleeve shaft and having a threaded portion threadedly engaging said first end plate, means for rotating said axial member to thus axially displace same, and linkage means interengaging said axial member and said second friction element for movement thereof upon axial displacement of said axial member to thus effect frictional engagement of said friction elements.

2. A brake and clutch mechanism for a reel including a frame having first and second end plates, means for fixedly holding said end plates spaced apart, a sleeve shaft journaled in said first and second end plates for rotation therein, a hollow hub having an inner surface and journaled on said sleeve shaft, a first friction element fixedly carried on the inner surface of said hollow hub, a first gear fixedly carried by said sleeve shaft, a second gear journaled in said first end plate and meshing with said first gear, a pawl for permitting only unidirectional rotation of said first gear, a crank for rotating said second gear and hence said first gear and sleeve shaft in said unidirectional rotation, a second friction element nonrotatively carried by said sleeve shaft and disposed closely adjacent said first friction element, an axial member concentrically disposed relative to said sleeve shaft and having a threaded portion threadedly engaging said first end plate, lever means for rotating said axial member to thus axially displace same, and linkage means interengaging said axial member and said second friction element for movement thereof upon axial displacement of said axial member to thus effect frictional engagement of said friction elements.

3. A brake and clutch mechanism for a reel including a frame having first and second end plates, means for fixedly holding said end plates spaced apart, a sleeve shaft journaled in said first and second end plates for rotation therein, a hollow hub having an inner surface and journaled on said sleeve shaft, a first friction element fixedly carried on the inner surface of said hollow hub, a first gear fixedly carried by said sleeve shaft, a second gear journaled in said first end plate and meshing with said first gear, a pawl for permitting only unidirectional rotation of said first gear, a crank for rotating said second gear and hence said first gear and sleeve shaft in said unidirectional rotation, a second friction element nonrotatively carried by said sleeve shaft and disposed closely adjacent said first friction element, said second friction element being axially movable relative to said first friction element and said sleeve shaft, spring means axially urging said first and second friction elements out of mutual frictional engagement, an axial member concentrically disposed relative to said sleeve shaft and having a threaded portion threadedly engaging said first end plate, lever means for rotating said axial member to thus axially displace same, and linkage means including an inner shaft disposed in said sleeve shaft interengaging said axial member and said second friction element for axial displacement thereof upon axial displacement of said axial member to thus effect frictional engagement of said friction elements.

4. A brake and clutch mechanism for a reel including a frame having first and second end plates, means for fixedly holding said end plates spaced apart, a sleeve shaft journaled in said first and second end plates for rotation therein, a hollow hub having an inner surface and journaled on said sleeve shaft, a first friction element fixedly carried on the inner surface of said hollow hub, a first gear fixedly carried by said sleeve shaft, a second gear journaled in said first end plate and meshing with said first gear, a pawl for permitting only unidirectional rotation of said first gear, a crank for rotating said second gear and hence said first gear and sleeve shaft in said unidirectional rotation, a second friction element nonrotatively carried by said sleeve shaft and disposed closely adjacent said first friction element, said second friction element being axially movable relative to said first friction element and said sleeve shaft, spring means axially urging said first and second friction elements out of mutual frictional engagement, an axial member concentrically disposed relative to said sleeve shaft and having a threaded portion threadedly engaging said first end plate, lever means for rotating said axial member to thus axially displace same, and linkage means including an inner shaft disposed in said sleeve shaft interengaging said axial member and said second friction element for axial displacement thereof upon axial displacement of said axial member to thus effect frictional engagement of said friction elements, said linkage means including ball means having a radial displacement upon axial displacement of said axial member.

5. A brake and clutch mechanism for a reel including a frame having first and second end plates, means for fixedly holding said end plates spaced apart, a sleeve shaft journaled in said first and second end plates for rotation therein, a hollow hub having an inner surface and journaled on said sleeve shaft, a first friction element fixedly carried on the inner surface of said hollow hub, a first gear fixedly carried by said sleeve shaft, a second gear journaled in said first end plate and meshing with said first gear, a pawl for permitting only unidirectional rotation of said first gear, a crank for rotating said second gear and hence said first gear and sleeve shaft in said unidirectional rotation, a second friction element nonrotatively carried by said sleeve shaft and disposed closely adjacent said first friction element, said second friction element being axially movable relative to said first friction element and said sleeve shaft, spring means axially urging said first and second friction elements out of mutual frictional engagement, an axial member concentrically disposed relative to said sleeve shaft and having a threaded portion threadedly engaging said first end plate, lever means for rotating said axial member to thus axially displace same, and linkage means including an inner shaft disposed in said sleeve shaft interengaging said axial member and said second friction element for axial displacement thereof upon axial displacement of said axial member to thus effect frictional engagement of said friction elements, said sleeve shaft having diametrically opposed slots therein, said linkage means including a transverse member transversely disposed relative to said sleeve shaft and extending through said slots in said sleeve shaft, said transverse member bearing against and adapted to axially displace said second friction element upon axial displacement of said axial member.

6. A brake and clutch mechanism for a reel including a frame having first and second end plates, means for fixedly holding said end plates spaced apart, a sleeve shaft journaled in said first and second end plates for rotation therein, a hollow hub having an inner surface and journaled on said sleeve shaft, a first friction element fixedly carried on the inner surface of said hollow hub, pawl means for permitting only unidirectional rotation of said sleeve shaft, means for rotating said sleeve shaft in said unidirectional rotation, a second friction element nonrotatively carried by said sleeve shaft and disposed closely adjacent said first friction element, an axial member concentrically disposed relative to said sleeve shaft and having a threaded portion threadedly engaging said first end plate, lever means for rotating said axial member to thus axially displace same, linkage means interengaging said axial member and said second friction element for movement thereof upon axial displacement of said axial member to thus effect frictional engagement of said friction elements, an indicating scale for cooperating with said lever means to indicate the degree of frictional engagement between the friction elements, and colored segments on the indicating scale to aid in the rapid determination of the degree of frictional engagement and hence braking or driving torque.

LESTER E. BUTZMAN, Sr.

REFERENCES CITED

The following references are of record in the file of this patent:

UNITED STATES PATENTS

| Number | Name | Date |
|---|---|---|
| 728,717 | Hunter | May 19, 1903 |
| 1,141,819 | Moyer | June 1, 1915 |
| 2,190,398 | Bugatti | Feb. 13, 1940 |
| 2,271,883 | Bannister | Feb. 3, 1942 |
| 2,282,995 | Dumond | May 12, 1942 |
| 2,329,381 | Bannister | Sept. 14, 1943 |

FOREIGN PATENTS

| Number | Country | Date |
|---|---|---|
| 233,821 | Germany | Apr. 24, 1911 |